UNITED STATES PATENT OFFICE.

JOSEPH L. JACKSON AND WILLIAM WRIGHT, OF SHERBROOKE, QUEBEC, CANADA.

LUBRICATING COMPOSITION.

1,097,549. Specification of Letters Patent. Patented May 19, 1914.

No Drawing. Application filed January 22, 1914. Serial No. 813,789.

*To all whom it may concern:*

Be it known that we, Joseph L. Jackson and William Wright, citizens of Canada, residing at Sherbrooke, in the Province of Quebec and Dominion of Canada, have invented new and useful Improvements in Lubricating Compositions, of which the following is a specification.

This invention relates to a lubricating composition designed especially for lubricating differential and transmitting gears, electric motor gears, and other like gears running in boxes, and also for lubricating journals that are exposed more or less to moisture, the object of the invention being to provide a lubricating composition which will effectually lubricate the parts, prevent the same from heating to an undesirable extent, preserve the metallic surfaces to a high degree, and protect the parts, whenever exposed, from moisture.

In carrying our invention into practical effect we provide a lubricating composition consisting, essentially, of a semi-solid plastic mixture of asbestos, soap stone, a suitable lubricating oil or grease, and borax, which ingredients are thoroughly combined in a mixing machine. The asbestos is employed in the natural fiber condition, and the soap stone and borax in ground or comminuted form. By employing asbestos fiber, instead of ground or comminuted asbestos, the particles of the composition are more thoroughly combined and maintained in intimate relationship, and provision made for their more uniform distribution to the surfaces to be lubricated. The purpose of the asbestos is to prevent the lubricated surfaces from heating unduly, and this is better effected where the asbestos is used in a fibrous instead of a comminuted condition, and at the same time the asbestos is prevented from working out under compression of the surfaces. The soap stone coöperates with the asbestos to hold the ingredients commingled, and also gives to the composition the desired body or density. The borax is employed to neutralize any acids which may be present in the oil or grease, and prevents the compound from becoming gummy. It also acts as an agent, in the event that any water should find its way into the bearing, to quickly emulsify or saponify the mixture, thus causing the water to be taken up and transformed into an element of the compound, whereby rusting of the metallic surfaces is prevented. The borax, unlike the sodas commonly employed, further acts as a cleanser and metal preservative, the advantages of which will be appreciated.

It will be observed that the present invention provides a semi-solid more or less plastic lubricant, which is adapted to run smoothly and evenly between the surfaces to be lubricated, and that a substantially equal consistency of the ingredients throughout the mass will be maintained under working action of the moving parts. The composition being devoid of gritty materials, and of a fluid like consistency, it is evident that a substantially uniform consistency or thickness will be preserved, thus preventing the precipitation of any solid materials liable to injure or choke up the parts of bearings or the teeth of gears. The use of natural asbestos fiber in this composition is of importance, since the particles of the fiber are matted or intermingled throughout the mass, and therefore serve not only to hold all of the particles combined but to act as a binder and spreader or distributer to convey the lubricant evenly to the surfaces, while at the same time acting as a heat reducing agent and forming a film and thereby preventing the grinding "moaning" noises of the gears.

In practice, the proportions of the different ingredients may vary, according to the work required. For light work 5% of asbestos may be used in connection with $91\frac{1}{2}$% of oil or grease, 1% of soap stone, and $2\frac{1}{2}$% of borax. For heavy work, and for high speed gearing, as high as 50% of asbestos may be employed, in connection with 10% of soap stone, 39% of oil or grease, and 1% of borax. The compound may be and preferably is used in connection with cotton waste, felt, leather or wool waste, but may be efficiently employed alone, where a degree of economy is not a primary factor.

We are aware of the fact that the different ingredients of our composition have heretofore been employed in lubricating or similar compositions, but never in conjunction with each other; and we have found that by the use of these ingredients in combination, a lubricating compound is produced which answers all requirements and which is superior to any of the prior compositions with which we are familiar, in lubricating qualities, coherence under all conditions of the ingredients, their cleansing and preservative action on the metallic surfaces, and the protection given to such surfaces against the deleterious action of moisture.

We claim:—

A lubricating composition consisting essentially, of a semi-solid more or less plastic mixture of the following ingredients, to wit: asbestos, in the form of natural asbestos fiber, from 5 to 50%, ground soapstone from 1 to 10%, oil or grease from about 91½ to 39%, and ground borax, from 2½ to 1%, the said asbestos fiber being matted throughout the mass so as to act as a binder, spreader or distributer and heat-reducing agent.

In testimony whereof we affix our signatures in presence of two witnesses.

JOSEPH L. JACKSON.
WILLIAM WRIGHT.

Witnesses:
G. W. BORLASE,
LILLIAN HAWKES.